United States Patent
Peng

[11] 3,825,365
[45] July 23, 1974

[54] COOLED TURBINE ROTOR CYLINDER
[75] Inventor: Yao Peng, Milford, Conn.
[73] Assignee: Avco Corporation, Stratford, Conn.
[22] Filed: Feb. 5, 1973
[21] Appl. No.: 329,480

[52] U.S. Cl............................. 415/117, 415/116
[51] Int. Cl..... F01d 5/08, F01d 11/08, F01d 25/26
[58] Field of Search........... 415/116, 117, 171, 115, 415/178; 60/39.66

[56] References Cited
UNITED STATES PATENTS

| | | | |
|---|---|---|---|
| 2,445,661 | 7/1948 | Constant et al.................. | 60/39.66 |
| 3,034,298 | 5/1962 | White.............................. | 415/116 |
| 3,365,172 | 1/1968 | McDonough et al.............. | 415/117 |
| 3,730,640 | 5/1973 | Rice et al......................... | 415/117 |
| 3,736,069 | 5/1973 | Beam et al....................... | 415/178 |
| 3,742,705 | 7/1973 | Sifford............................. | 415/117 |

*Primary Examiner*—Carlton R. Croyle
*Assistant Examiner*—Louis J. Casaregola
*Attorney, Agent, or Firm*—Charles M. Hogan; Gary M. Gron

[57] ABSTRACT

An air-cooled turbine rotor cylinder comprising an inner ring positioned adjacent the tips of a plurality of turbine blades attached to a turbine disc. An integral outer ring and an integral web form an annular space between the rings. Cooling air is supplied to the open end of the annular space and exits through ports upstream of the turbine blades to cool the inner ring. A baffle having a series of ribs is provided in the annular space and acts to provide a short path for cooling air at lower temperatures and a substantially longer flow path at higher temperatures. This acts to minimize the variation in radial thermal growth in the inner ring.

9 Claims, 3 Drawing Figures

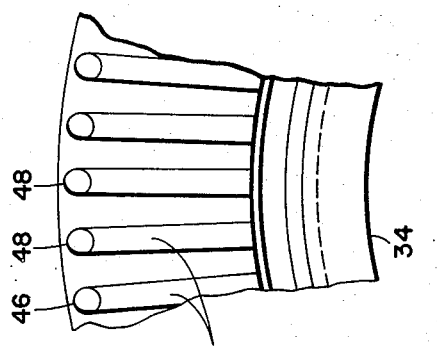
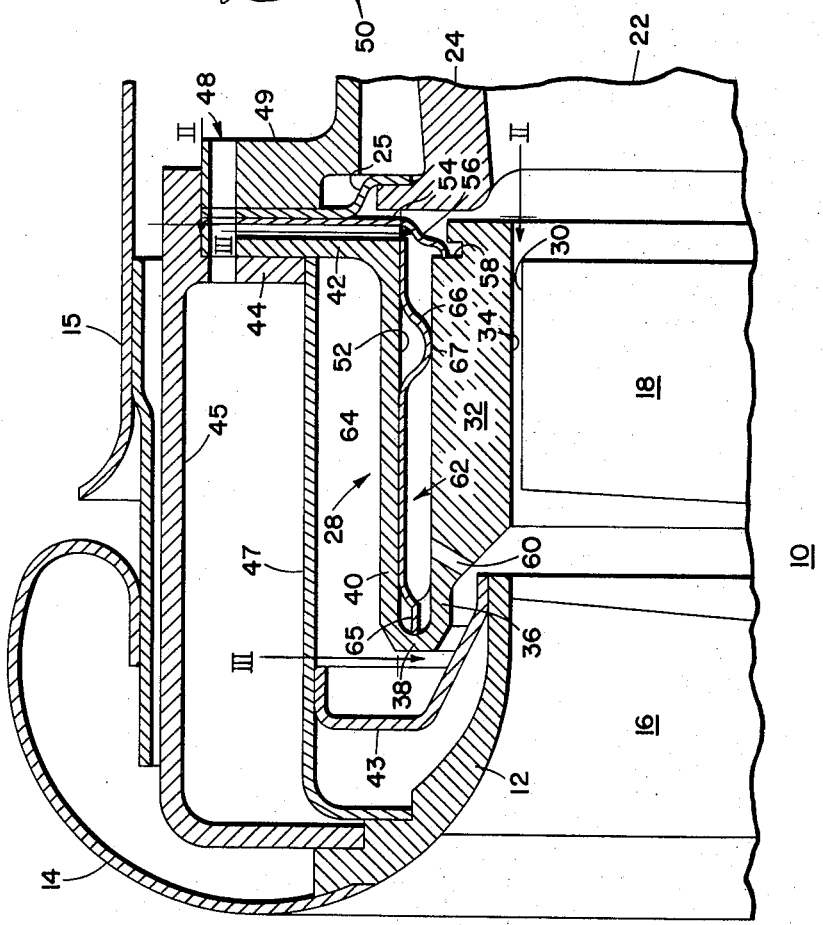
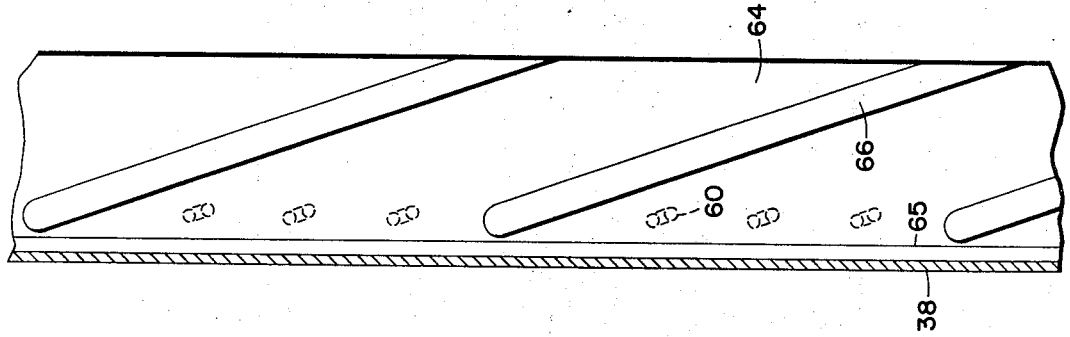

COOLED TURBINE ROTOR CYLINDER

The present invention relates to turbomachines and more particularly to cylinders for turbine rotors.

One of the more important parameters in the design of a turbomachine is the clearance between an annular cylinder and the tips of turbine blades that rotate within the cylinder in response to the passage of hot gas across the blades. As this clearance is reduced, the efficiency of the turbine increases. The theoretical ideal is a zero clearance, but this cannot be achieved because dimensions of the cylinder and the blades vary in a different fashion in response to changes in engine operating conditions. The turbine blades grow in length because of thermal expansion and because of centrifugal force. The cylinder grows radially because of thermal expansion.

The clearance between the tips of the blades and the cylinder have to be designed for transient conditions to avoid rubs between the tips of the blades and the cylinder. However, this results in very large tip clearances at steady-state operation. In the past a number of schemes have been proposed for cooling the cylinder to minimize its thermal growth and reduce the tip clearance. However, many of these are complicated schemes that have only limited effectiveness in maintaining the thermal growth at a reasonable level.

It is an object therefore of the present invention to cool a cylinder for a turbine rotor in a simplified, reliable and effective manner.

These ends are achieved by a cylinder for a turbine rotor in which the cylinder comprises an inner annular ring positioned radially outward from and closely adjacent the tips of a plurality of turbine blades. An integral outer ring is positioned radially outward from the inner ring and connected to it at one end by an integral web portion to form an open-ended annular space between the inner and outer rings. A support flange integral with the second end of the outer ring is adapted to be substantially fixed relative to the axis about which the turbine rotor rotates. A means is provided for receiving cooling air and directing it into the open end of the annular space between the inner and outer rings. The inner ring has a plurality of generally inwardly directed exit ports adjacent one end for discharging cooling air. This permits a flow of cooling air through the annular space, thereby minimizing the maximum radial thermal growth of the inner ring.

The above and other related objects and features of the present invention will be apparent from a reading of the following description of the disclosure shown in the accompanying drawing and the novelty thereof pointed out in the appended claims.

In the drawing:

FIG. 1 is a fragmentary longitudinal section view of a turbomachine showing a turbine rotor and a cylinder embodying the present invention;

FIG. 2 is a fragmentary view taken on line II—II of FIG. 1; and

FIG. 3 is a fragmentary view also, taken on line III—III of FIG. 1 in a reduced scale.

FIG. 1 is a fragmentary longitudinal view of an axial flow turbomachine assembly 10. The turbomachine 10 comprises an outer shroud 12, an inner shroud (not shown) and a plurality of vanes 16 positioned between the shrouds to direct and accelerate a hot gas stream that passes through a turbine inlet duct defined in part by an annular inner curl 14. The turbine duct receives the gas stream from a combustor defined in part by a wall 15 extending to the inner curl 14. While the hot gas stream used to drive the turbomachine is derived from a combustor, as in a gas turbine engine, it may be supplied from any other type of combustion or hot gas generating device.

The gas stream from the vanes 16 passes across a plurality of turbine blades 18 secured to a rotatable annular turbine hub, not shown to simplify the discussion of the present invention. The passage of the gas across the turbine blades 18 imparts a rotary motion to the turbine hub that may be coupled to a compressor of a gas turbine engine or to an output shaft to produce a rotary output. The gas that has passed across the turbine blades 18 may be simply discharged into the atmosphere or may be redirected through a series of vanes 22 supported by an outer shroud 24 and inner shroud (not shown) across additional turbine rotor assemblies. A cylinder, generally indicated at 28, is positioned radially outward from and closely adjacent the tips 30 of the turbine blades 18 to minimize the passage of gas across the tips 30 of the blades 18.

The cylinder 28 comprises an inner relatively thick ring 32 having an inner surface 34 radially outward from and closely adjacent the tips 30 of the blades 18. Ring 34 has a thinner forward section 36 connecting through an integral web 38 to the forward end of a thinner outer ring 40. Outer ring 40 has an aft radially extending flange 42 adapted to be secured to an annular support flange 44 through a series of bolt assemblies (not shown) at spaced locations around its periphery. Flange 44 is integral with a cylindrical frame element 45 which connects at its forward end with the shroud 12. The frame element is adapted to be fixed relative to the axis of rotation of the turbine rotor through a suitable structural arrangement well known to those skilled in the art. An annular baffle 47 extends from flange 44 to shroud 12 to form a chamber for cooling air between baffle 47 and frame element 45. An annular baffle 43 extends from baffle 47 to the downstream edge of shroud 12 to form an additional cooling air chamber for shroud 12. Suitable passages (not shown) between these elements direct cooling air to the shroud 12 and vanes 16. Cooling air for this purpose is supplied from a suitable source (compressor air in the case of a gas turbine engine) and passes through a plurality of passages 48 extending through flanges 44 and 42 (see FIG. 2). The connection from the compressor has been omitted to assist in the simplified explanation of the present invention. It should be apparent, however, to those skilled in the art that many schemes can be adopted to connect the source of air from the compressor to the ports 48.

A series of radial grooves 50 extend from the passages 48 in flange 42 inward to the inner periphery 52 of the outer ring 40. A thin sheetlike flange element 54 abuts the aft face of flange 42 to form a series of radial passages in combination with grooves 50. Flange 54 has a lip portion 56 abutting a circumferential groove 58 in inner ring 32 so that the open end of the annular space formed between the inner and outer rings 32 and 40, respectively, is sealed.

A series of exit ports 60 are provided through inner ring 32 from the annular space to a point connected to the hot gas stream flowing across the blades 18. As shown particularly in FIG. 3, the axes of these ports define acute angles with respect to a plane normal to the central axis of the cylinder 28.

A baffle 62 of annular form is positioned in the annular space between the rings 32 and 40. Baffle 62 comprises an annular thin wall element 64 having a plurality of integral ribs 66 formed in the side facing the inner ring 32. A lip 65 on the forward end of element 64 abuts web portion 38 of the cylinder 28 to position the baffle 62. As seen in FIG. 3, the ribs 66 extend in a direction which defines an acute angle with respect to a plane normal to the axis of the cylinder 28. The crowns 67 of the ribs 66 are formed to give a predetermined rib height relative to the radial space between the rings 32 and 40 so that at the maximum anticipated temperature of ring 32, and therefore its maximum radial growth, the crowns 67 abut the outer wall of the ring 32.

During operation of the turbomachine the hot gas stream passes through vanes 16 and across blades 18 thereby causing the turbine rotor to turn. The gas stream heats up ring 32 thereby causing it to grow radially due to thermal expansion. The thickness of ring 32 keeps it from becoming noncircular because of distortion and the web 38 and outer ring 40 permit this expansion while still maintaining ring 32 concentric with the axis of the turbine rotor. The cooling air passes through grooves 50 into the annular space between the rings and out of ports 60 to reduce the temperature of the ring 32 and thus minimize its maximum thermal growth.

At the maximum anticipated temperature of ring 32, the ribs 66 abut the outer surface of ring 32. This directs the cooling air to the exit ports 60 through a path generally parallel to the ribs 66. As is apparent from FIG. 3, the flow path for air under these conditions is substantial and the cooling effectiveness is maximized.

At temperatures lower than the maximum, the ring 32 tends to shrink radially toward its normal size. When this happens a clearance is created between the crowns 67 of the ribs 66 and the outer surface of ring 32. This permits the cooling air to pass over the ribs 66 and to the exit ports 60 through a path generally parallel to the axis of the cylinder 28. This flow path for the cooling air is substantially shorter than the flow path when the ribs 66 abut ring 32. As a result, the cooling effectiveness of the air is decreased so the temperature of ring 32 is maintained at a level closer to its maximum temperature than an arrangement where the cooling effectiveness is always at a uniform level. This in turn causes ring 32 to assume a radial growth that is very uniform irrespective of variations in engine operating temperature. The ultimate result is a stable turbine blade tip clearance that assures a predictable and desirable engine efficiency.

The exit ports 60 discharge the cooling air upstream of the blades 18 so that its mass flow is added to the mass flow of the hot gas stream passing across the turbine blades 18, thereby increasing its efficiency relative to a condition where the air is discharged downstream of the blades or discharged to an overboard location. Since the ports 60 direct the air into the stream with a tangential component approximately that of the gas stream, any disturbance in the gas stream flowing across the turbine blades 18 is minimized, if not eliminated.

While the preferred embodiment of the present invention has been described, it should be apparent from those skilled in the art that the invention may be practiced in other forms without departing from the spirit and scope thereof.

Having thus described the invention, what is claimed as novel and desired to be secured by letters Patent of the United States is:

1. A cooled cylinder for a turbine rotor having a plurality of radially extending blades, said cylinder comprising:
   an inner annular ring positioned radially outward from and closely adjacent the tips of said blades;
   an integral outer ring positioned radially outward from said inner ring and connected to a first end of said inner ring at a first end of said outer ring by an integral web portion to form an open-ended annular space between the inner and outer rings;
   a support flange integral with the second end of said outer ring and adapted to be substantially fixed relative to axis of rotation of said turbine rotor;
   means for receiving cooling air and directing it into the open end of annular space between said inner and outer rings, said inner ring having a plurality of generally inwardly directed exit ports adjacent the first end thereof for discharging said cooling air and permitting a flow of cooling air through said annular space thereby minimizing the maximum radial thermal growth of said inner ring; and
   an element for varying the effective flow path of air passing through said annular space in response to the temperature of said inner ring so that temperature-induced variations in radial thermal growth of said inner ring are minimized, said element defining a relatively long flow path for maximum anticipated temperatures of said inner ring and a substantially shorter flow path for temperatures lower than said maximum.

2. A cooled turbine rotor cylinder as in claim 1 wherein said element comprises a baffle received in the annular space between said inner and outer rings and defining a relatively long flow path for maximum anticipated temperatures of said inner ring and a substantially shorter flow path for temperatures lower than said maximum.

3. A cooled turbine rotor cylinder as in claim 2 wherein said baffle comprises an annular thin wall element having a plurality of integral ribs formed in the side facing said inner ring, said ribs having their longitudinal axes extending in a direction defining an acute angle with respect to a plane normal to the central axis of said ring, the height of said ribs being selected to be maintained in abutment with said inner ring, at said maximum temperatures to direct cooling fluid in a tangential direction through a substantial flow path to said exit ports, said ribs being spaced from said inner ring for temperatures lower than said maximum thereby permitting cooling air to flow over said ribs to said exit ports through a substantially shorter flow path.

4. A cooled turbine rotor cylinder as in claim 3 wherein said exit ports extend also in a generally tangential direction so that the cooling air is discharged into the hot gas stream with a tangential component generally similar to that of said hot gas stream.

5. A cooled turbine rotor cylinder as in claim 1 wherein the first ends of said inner and outer rings are positioned upstream from said turbine blades and the open end positioned downstream, whereby cooling air discharged from said exit ports passes into the gas stream flowing across said blades for increasing the mass flow of gases across said blades.

6. A cooled turbine rotor cylinder as in claim 5 wherein said exit ports are angled in the direction of the gas flow across said blades so that the cooling air produces a minimum disturbance to the hot gas stream flowing across said blades.

7. A cooled turbine rotor cylinder as in claim 1 wherein said cooling air directing means comprises:
a thin wall flange element secured to the aft face of said support flange and having a lip portion extending across the annular space between said rings for sliding sealing engagement with said inner ring, said support flange having a plurality of radially outward cooling air distribution passages and a plurality of radial grooves extending from said distribution passages to the annular space between said rings.

8. A cooled turbine rotor cylinder as in claim 7 further comprising a baffle received in the annular space between said inner and outer rings, said baffle defining a substantial flow path for cooling air when said inner ring is at a maximum anticipated temperature and defining a shorter flow path for air when said inner ring is at a temperature lower than said maximum temperature, whereby temperature induced variations in radial thermal growth of said inner ring are minimized.

9. A cooled turbine rotor cylinder as in claim 8 wherein said baffle comprises a thin wall annular element having a plurality of integral ribs formed on the side facing said inner ring, said ribs extending in a direction defining an acute angle with respect to a plane normal to the central axis of said cylinder, said ribs having a predetermined height relative to the distance between said inner and outer rings so that said ribs abut the inner ring to direct cooling air in a tangential direction having a substantial flow path to said exit ports for said maximum temperature and spaced from said inner ring for lower temperatures to permit a relatively shorter flow path for cooling air at temperatures lower than said maximum.

* * * * *